United States Patent
Sekoguchi

(10) Patent No.: US 7,185,543 B2
(45) Date of Patent: Mar. 6, 2007

(54) ULTRA-PRECISION MICRO-DIFFERENTIAL PRESSURE MEASURING DEVICE AND ULTRA-PRECISION DIFFERENTIAL PRESSURE MEASURING DEVICE

(75) Inventor: Kotohiko Sekoguchi, 8-10-1304 Sakaemachi, Ikeda-shi, Osaka (JP) 5630056

(73) Assignees: Fujikin Incorporated, Osaka (JP); Kotohiko Sekoguchi, Ikeda (JP)

( * ) Notice: Subject to any disclaimer, the term of this patent is extended or adjusted under 35 U.S.C. 154(b) by 0 days.

(21) Appl. No.: 10/546,159

(22) PCT Filed: Feb. 12, 2004

(86) PCT No.: PCT/JP2004/001513

§ 371 (c)(1), (2), (4) Date: Aug. 22, 2005

(87) PCT Pub. No.: WO2004/074802

PCT Pub. Date: Sep. 2, 2004

(65) Prior Publication Data

US 2006/0065057 A1   Mar. 30, 2006

(30) Foreign Application Priority Data

Feb. 20, 2003  (JP)  ............................ 2003-042247
Sep. 25, 2003  (JP)  ............................ 2003-332600

(51) Int. Cl.
   *G01L 13/02*   (2006.01)

(52) U.S. Cl. .......................................... 73/736; 73/716
(58) Field of Classification Search .......... 73/700–756; 361/283.1–283.4
See application file for complete search history.

(56) References Cited

FOREIGN PATENT DOCUMENTS

| CN | 1409182 A | * | 4/2003 |
|---|---|---|---|
| JP | 57-35743 A | | 2/1982 |
| JP | 02-52975 A | | 2/1990 |
| JP | 6-76937 B2 | | 9/1994 |
| JP | 2004226377 A | * | 8/2004 |

* cited by examiner

Primary Examiner—Edward Lefkowitz
Assistant Examiner—Jermaine Jenkins
(74) Attorney, Agent, or Firm—Griffin & Szipl, P.C.

(57) ABSTRACT

The ultra-precision micro-differential pressure measuring device comprises a device body 1 having an inner space part therein, a pressure receiving plate 3 which is installed inside the inner space of the device body 1 and divides the said inner space hermetically into a lower space 7 and an upper part space 8, an electronic weighing and pressure converting device 2 which is installed in the lower space 7, and supports and secures the pressure receiving plate 3, and a liquid sealing part R which liquid-seals the outer peripheral part of the aforementioned pressure receiving plate 3 and maintains the air-tightness between the lower space 7 and the upper space 8. A micro-differential pressure between a pressure P1 inside the upper space 8 and a pressure P2 inside the lower space 7 is measured by the electronic weighing and pressure converting device 2 through the pressure receiving plate 3.

9 Claims, 4 Drawing Sheets

ULTRA-PRECISION MICRO-DIFFERENTIAL PRESSURE MEASURING DEVICE AND ULTRA-PRECISION DIFFERENTIAL PRESSURE MEASURING DEVICE

This is a National Phase Application in the United States of International Patent Application No. PCT/JP2004/001513 filed Feb. 12, 2004, which claims priority on Japanese Patent Application No. JP 2003-042247, filed Feb. 20, 2003, and on Japanese Patent Application No. JP 2003-332600, filed Sep. 25, 2003. The entire disclosures of the above patent applications are hereby incorporated by reference.

FIELD OF THE INVENTION

The present invention is concerned with an ultra-precision micro-differential pressure measuring device and an ultra-precision differential measuring device in which a high-performance electronic weighing and pressure converting device is employed. The present invention is also concerned with an ultra-precision micro-differential pressure measuring device which is used as a standard instrument for a differential pressure gauge, and also used as a tool for measuring the pressure drop characteristics of a low-resistance filter, monitoring the filter characteristics, and assessing the flow characteristics of the fluid equipment which deals with gases under a reduced pressure, and further an ultra-precision differential pressure measuring device widely used for the measurement of the differential pressure of approximately 2~5 atmospheric pressure.

BACKGROUND OF THE INVENTION

The Askania type micro-manometer and the liquid column manometer in which the liquid column height is measured visually have been commonly used as standard instruments to measure a micro-pressure or micro-differential pressure. A model in which a force that acts on the ram mechanism of a cylinder is weighed by an electronic weighing device has been also used.

Furthermore, a method in which the differential pressure is electrically detected by a strain gauge, a semiconductor gauge or the like is also used, but not widely.

However, for example, with the former, i.e., the Askania type micro-manometer in which the liquid column height is measured visually, the maximum resolution power of the measuring is approximately 0.01 mm. This means that it is totally impossible to continuously and accurately measure the micro-differential pressure of the water column of a nanometer (nmAq) order lower than 0.01 mm. And, the measured values cannot be outputted as electric signals continuously.

With the latter, i.e., the electronic differential pressure measuring device wherein an electronic weighing device is employed, the measurement result can be outputted as electric signals continuously. However, this device has a problem that the occurrence of measurement errors arising from the friction of moving or sliding parts and a low degree of mechanical machining precision is unavoidable because the device is so constituted that a force generated by the pressure to be measured is transmitted to an electronic weighing and pressure converting device by way of a stem, a ram and the like with the result that a high-precision measurement of the micro-differential pressure can not be achieved. (The JITSU-KOU-HEI No.6-76937 and the TOKU-KOU-HEI No.2-52975 and others)

The problem is shared by a wide-use type electronic differential pressure measuring device which is aimed to measure the differential pressure of approximately 2~5 atmospheric pressure. Measurement errors due to friction of moving parts are also unavoidable, thus resulting in failure of the high-precision measurement.

Patent Literature 1 Public Bulletin JITSU-KOU-HEI No.6-76937

Patent Literature 2 Public Bulletin TOKU-KOU-HEI No.2-52975

DISCLOSURE OF THE INVENTION

Object of the Invention

The present invention is intended to solve the aforementioned problems of the conventional measuring devices for micro-pressure and micro-differential pressure and widely used electronic differential pressure measuring devices: that is, (1) according to the device in which the liquid column height is detected visually, the measurement precision is low and the measured values can not be outputted continuously, and (2) according to the electronic type weighing device, the occurrence of the measurement errors is unavoidable due to friction of movable parts in the mechanism to convert the pressure into a force and transmit the same to the electronic weighing device with the result that it is difficult to measure the micro-differential pressure while the measuring precision is low. It is a primary object of the present invention to provide an ultra-precision micro-differential pressure measuring device and an ultra-precision differential pressure measuring device in which an electronic weighing and pressure converting device is installed in the space in which a pressure to be measured is applied, and the afore-mentioned space to which the pressure to be measured is applied and the other space in which a pressure is measured are divided and isolated hermetically from each other with a sealing liquid or by a dividing film in cooperation with a pressure receiving plate, thus making possible the high-precision measurement of the micro-differential pressure of the water column of a nanometer (nmAq) order having three effective digits, and the ultra-precision measurement of the differential pressure of approximately 2~5 atmospheric pressure.

MEANS OF THE INVENTION

The inventors of the present invention have noted that according to the conventional method in which a force applied on the pressure receiving plate forming a pressure receiving face is transmitted to the electronic weighing device with the pressure receiving plate being supported by a sliding (moving) mechanism, a frictional resistance generated at the afore-mentioned sliding part causes errors such that it is inappropriate for measuring the micro-differential pressure. Thus, the inventors of the present invention have come to an idea in which to avoid the errors caused by the frictional resistance, the pressure receiving plate forming the pressure receiving face is supported by and fixed to the base of the electronic weighing and pressure converting device without restraining the pressure receiving plate and a liquid sealing method is adopted to air-tightly divide the two spaces, to which the pressures are applied, on the upper and lower sides of the pressure receiving plate.

At the same time, the inventors of the present invention have come to an idea that, in the event of measuring the differential pressure of approximately 2~5 atmospheric pressure a thin resin film or a metal-made film body is employed as a dividing film to replace the afore-mentioned liquid sealing method such that a higher precision differential pressure measurement is achieved.

The present invention is created based on the afore-mentioned ideas and measuring test results. The device according to the present invention in accordance with a first embodiment comprises a device body 1 having an inner space inside, a pressure receiving plate 3 which is installed in the inner space inside the device body 1 and air-tightly divides the said inner space into a lower space 7 and an upper space 8, an electronic weighing and pressure converting device 2 which is installed inside the lower space 7 and on which the pressure receiving plate 3 is supported and fixed, and a liquid sealing part R which liquid-seals the outer peripheral part of the afore-mentioned receiving plate 3 and air-tightly separates the lower space 7 and the upper space 8 so that a micro-differential pressure between a pressure P1 inside the upper space 8 and a pressure P2 inside the lower space 7 is measured by an electronic weighing and pressure converting device 2 via the pressure receiving plate 3.

The present invention in accordance with a second embodiment relates to a device as in the first embodiment, wherein the device body 1 is so constructed that a lower part body 1a provided with a pressure introducing hole 7a in communication with the lower space 7 and an upper part body 1b provided with a pressure introducing hole 8a in communication with the upper space 8 are placed opposite to each other and combined, and the device body 1 is provided with a ring-shaped sealing liquid storage groove 9 at the inner wall face in the inner space.

The present invention in accordance with a third embodiment relates to a device as in the first embodiment, wherein the pressure receiving plate 3 comprises a flat-shaped disc plate 3a and a sealing wall 3b extending downwardly from the outer periphery of the disc plate 3a.

The present invention in accordance with a fourth embodiment relates to a device as in the first embodiment, wherein the electronic weighing and pressure converting device 2 is so constructed that the measurement values are continuously taken out of the electronic weighing and pressure converting device 2 in the form of electric signals and transmitted to a computer to be converted into differential pressures and outputted.

The present invention in accordance with a fifth embodiment relates to a device as in the fourth embodiment, wherein the electronic weighing and pressure converting device 2 comprises an electronic weighing device and a computer which converts measurement signals from the electronic weighing device to differential pressures.

The present invention in accordance with a sixth embodiment relates to a device as in the first embodiment, wherein the electronic weighing and pressure converting 2 has a supporting base 5 on which a supporting body 4 is provided so that the pressure receiving plate 3 is supported by and fixed to the supporting body 4.

The present invention in accordance with a seventh embodiment relates to a device as in the first embodiment, wherein the electronic weighing and pressure converting device 2 is so constructed that the pressure receiving plate 3 is supported by and fixed to the supporting body 4 whose upper and/or lower ends are pointed.

The present invention in accordance with an eighth embodiment, relates to a device wherein a liquid sealing part R comprises a ring-shaped sealing liquid storage groove 9 formed at the inner wall face of the inner space of the device body 1, a sealing liquid 6 filled in the sealing liquid storage groove 9, and the ring-shaped sealing wall 3b extending downwardly from the periphery of the pressure receiving plate a lower end of which is inserted into the sealing liquid 6 from above.

The present invention in accordance with a ninth embodiment relates to a device as in the eighth embodiment, wherein the liquid sealing part R is surface-treated so that uniform wettability is secured entirely or partly on the liquid contacting part.

The present invention in accordance with a tenth embodiment relates to an ultra-precision differential pressure measuring device wherein the device comprises a device body 1 having an inner space inside, a pressure receiving plate 3 which is installed in the inner space of the device body 1 and divides the said inner space hermetically into a lower space 7 and an upper space 8, an electronic weighing and pressure converting device 2 installed inside the lower space on which the pressure receiving plate 3 is supported and secured, and a dividing film 10 which is provided in a space between the outer periphery of the pressure receiving plate 3 and inner wall face of the device body 1 to keep air-tightness between the lower space 7 and the upper space 8 wherein the differential pressure between a pressure P1 inside the upper space 8 and a pressure P2 inside the lower space 7 is measured by the electronic weighing and pressure converting device 2 via the pressure receiving plate 3.

The present invention in accordance with an eleventh embodiment relates to a device as in the tenth embodiment, wherein the device body 1 is so constructed that a lower part body 1a provided with a pressure introducing hole 7a in communication with the lower space 7 and an upper part body 1b provided with a pressure introducing hole 8a in communication with the upper space 8 are placed opposite to each other and combined; and a fitting groove 3d is formed on the outer periphery of the pressure receiving plate 3 at a right angle relative thereto so that the inner periphery of the dividing film 10 is inserted into the fitting groove 3d while a fitting groove 1d is formed on the inner wall face of the device body 1 at a right angle relative thereto and at the position as high as the position of the afore-mentioned fitting groove 3d so that the outer periphery of the dividing film 10 is inserted into the fitting groove 1d.

The present invention in accordance with a twelfth embodiment relates to a device as in the tenth embodiment, wherein the dividing film 10 is a brim-shaped dividing film formed of a resin film or a thin metal film, and an outer peripheral part of the said dividing film 10 and an inner peripheral part thereof are hermetically inserted into the fitting groove 1d of the device body and the fitting groove 3d of the pressure receiving plate 3 respectively.

The present invention in accordance with a thirteenth embodiment relates to a device as in the tenth embodiment, wherein the measurement values are continuously taken out from the electronic weighing and pressure converting device 2 in the form of electric signals, and converted to the differential pressure by a computer and outputted.

The present invention in accordance with a fourteenth embodiment relates to a device as in the tenth embodiment, wherein the electronic weighing and pressure converting device 2 comprises an electronic weighing device and a computer which converts the measurement signal from the electronic weighing device into the differential pressure and outputs the same.

The present invention in accordance with a fifteenth embodiment relates to a device as in the tenth embodiment, wherein a supporting body 4 is provided on a base 5 on the electronic weighing and pressure converting device 2 so that the pressure receiving plate 3 is supported by and fixed to the supporting body 4.

The present invention in accordance with a sixteenth embodiment relates to a device as in the tenth embodiment, wherein the electronic weighing and pressure converting device 2 is so constructed that the pressure receiving plate 3 is supported and fixed by the supporting body 4 whose upper ends or lower ends or both are pointed.

EFFECTS OF THE INVENTION

According to the ultra-precision micro-differential pressure measuring device in accordance with the present invention, the pressure receiving plate 3 is never affected by a meniscus formed by the sealing liquid 6 because there is no involvement of up and down movements of the pressure receiving plate 3.

Although the heights of the liquid levels of the sealing liquid 6 which forms two ring-shaped liquid surfaces differ depending on the differential pressure ΔP between the pressure spaces 7 and 8, as will be explained later, it is not mandatory that the areas A1 and A2 of the liquid surfaces should be the same.

Furthermore, in the event that the shape of the liquid surface changes due to a micro-change of the differential pressure ΔP between the pressure spaces 7 and 8, a change of the meniscus formed by the sealing liquid 6 is caused such that a force that acts on the pressure receiving plate 3 in the upward and downward directions is induced.

However, precision of the measuring of the differential pressure is not affected because the force is counterbalanced between the ring-shaped liquid levels of the inside and the outside (the two liquid faces).

With the present invention, the electronic weighing and pressure converting device 2 is installed inside the lower space 7 in the device body 1, and the inside of the device body is divided hermetically into the lower space 7 and the upper space 8 by the pressure receiving plate 3 and the liquid sealing part R at the periphery of the pressure receiving plate 3. Further, the force applied by the differential pressure between the spaces 7 and 8 on the afore-mentioned pressure receiving plate 3 is continuously measured with the electronic weighing and pressure converting device 2, and converted into the differential pressure and outputted in the form of the electric signals.

As a result, the force exerted by the differential pressure is directly transmitted to the electronic weighing and pressure converting device 2 through the pressure receiving plate 3 fixed on the electronic weighing and pressure converting device 2. Because there exists no mechanical friction part in the transmission route of the force exerted by the differential pressure, precision of the measuring of the differential pressure is remarkably improved. By employing the electronic weighing and pressure converting device 2 with the minimum measurement capacity as suitably chosen, a continuous high-precision measurement of the micro-differential pressure having effective figures of three digits or more becomes possible with the ultra-precision micro-differential pressure measuring device in accordance with the present invention. For example, in the case of the electronic weighing and pressure converting device 2 having a minimum measurement capacity of 0.0001 g, a continuous high-precision measurement of the differential pressure of the water column of a few hundred nanometer order becomes possible.

Any kind of liquid can be used as the sealing liquid because the density of the sealing liquid 6 which forms the liquid sealing part R is irrelevant to the measurement of the differential pressure.

As a result, the manufacturing costs are significantly reduced because the selection of the sealing liquid is easy and the structure of the measuring device itself is simple.

Furthermore, with the ultra-precision differential pressure measuring device in accordance with the present invention, since the dividing film 10 is made of a flexible thin film, a force in the upward and downward directions applied on the pressure receiving plate 3 is not induced by the insertion of the dividing film 10 into the fitting groove 1*d* of the device body 1 and the fitting groove 3*d* of the pressure receiving plate 3.

In addition, because the form or weight of the pressure receiving plate 3, that is, its material, thickness or shape is irrelevant to the measurement of the differential pressure, the material, thickness or shape of the pressure receiving plate 3 can be chosen as desired, thus further making it possible to reduce the manufacturing costs of the differential pressure measuring device.

With the conventional differential pressure measuring device, a standard instrument and the like has been required for correction or test. Further, an actual occurrence of the differential pressure has been needed at the time of the test. However, the differential pressure measuring device in accordance with the present invention is extremely advantageous in that the correction and test can be performed easily requiring no differential pressure because a dead weight equivalent to the differential pressure (pressure) can be used instead.

As described above, the present invention is capable of continuously measuring the micro-differential pressure with high precision and continuously outputting the measurement values in the form of electric signals using the device which has a simple construction and can be produced at a low cost. Therefore, the present invention has excellent, practical advantages.

LIST OF REFERENCE CHARACTERS AND NUMERALS

Figure 1:
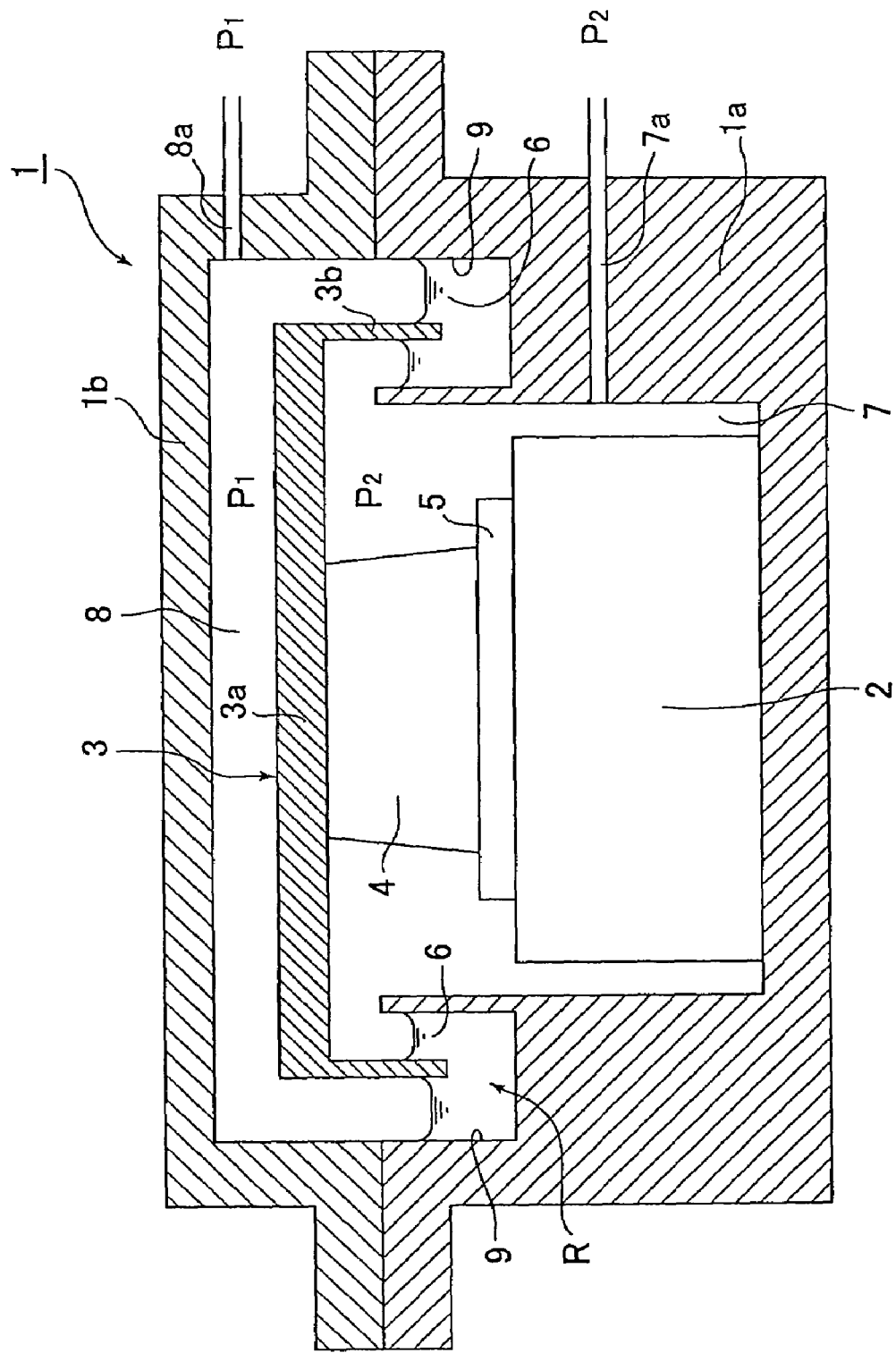
FIG. 1 is a cross-sectional schematic view of the ultra-precision micro-differential measuring device in accordance with the first embodiment of the present invention.

1 Device body
1*a* Lower part body
1*b* Upper part body

1d Fitting groove
2 Electronic weighing and pressure converting device
3 Pressure receiving plate
3a Flat-shaped disc plate
3b Sealing wall
3c Receiving groove
3d Fitting groove
4 Supporting body
4a Pointed end
5 Base for supporting body
6 Sealing liquid
7 Lower space
7a Pressure introducing hole
8 Upper space
8a Pressure introducing hole
9 Sealing liquid storage groove
R Ring-shaped liquid-sealing part (Sealing wall 3b, Sealing liquid 6 and Storage groove 9)
A1 Area of outer ring-shaped part
A2 Area of inner ring-shaped part
S1 Area of upper surface of pressure receiving plate
S2 Area of lower surface of pressure receiving plate
Se Effective pressure receiving area
De Effective diameter
ρ Density of sealing liquid
g Gravitational acceleration
Po Pressure inside upper and lower spaces shown when differential pressure is zero
hbo Distance between lower end surface of sealing wall 3b and liquid level shown when differential pressure is zero
Pbo Liquid pressure at position of lower end surface of sealing wall 3b shown when differential pressure is zero
P1 Pressure inside upper space 8
P2 Pressure inside lower space 7
hb Distance between lower end face of sealing wall 3b and liquid level of outer ring-shaped part shown when there exists differential pressure
h1 Distance between liquid level of outer ring-shaped part shown when there exists differential pressure and liquid-level shown when differential pressure is zero
h2 Distance between liquid level of inner ring-shaped part shown when there exists differential pressure and liquid level shown when differential pressure is zero
Pb Liquid pressure at lower end face of sealing wall 3b shown when there exists differential pressure
10 Dividing film
D Diameter of pressure receiving plate
δ Space between end face of pressure receiving plate 3 and inner wall face of lower part body 1a

BEST MODE OF CARRYING OUT THE INVENTION

The following embodiments of the present invention are described with reference to the drawings hereunder.

FIG. 1 is a cross-sectional schematic view of an ultra-precision micro-differential pressure measuring device in accordance with the present invention. With reference to FIG. 1, 1 designates a device body, 2 an elctronic weighing and pressure converting device, 3 a pressure receiving plate, 4 a supporting body, 5 a base for the electronic weighing and pressure converting device, and 6 a sealing liquid.

The afore-mentioned device body 1 is made of metal or an engineering plastic in the shape of a box in which an inner space is provided. With the present embodiment, the device body 1 is made up of a lower part body 1a and an upper part body 1b which are placed opposite to each other and combined together in an air-tight manner.

With the embodiment in FIG. 1, the lower part body 1a and upper part body 1b which are both disk-shaped in the plane configuration are placed opposite to each other and air-tightly combined so that the device body 1 is formed. However, there is no need to say that any form or structure of the device body 1 can be chosen as desired.

The afore-mentioned lower part body 1a is provided with a pressure introducing hole 7a in communication with the lower space 7 while the upper part body 1b is provided with a pressure introducing hole 8a in communication with the upper inner space 8.

At the inner peripheral wall of the device body 1 a ring-shaped storage groove 9 for storing a sealing liquid 6 which has predetermined width and depth is formed and is open in the upward direction. The sealing liquid 6 is stored inside the said storage groove 9.

Figure 3:
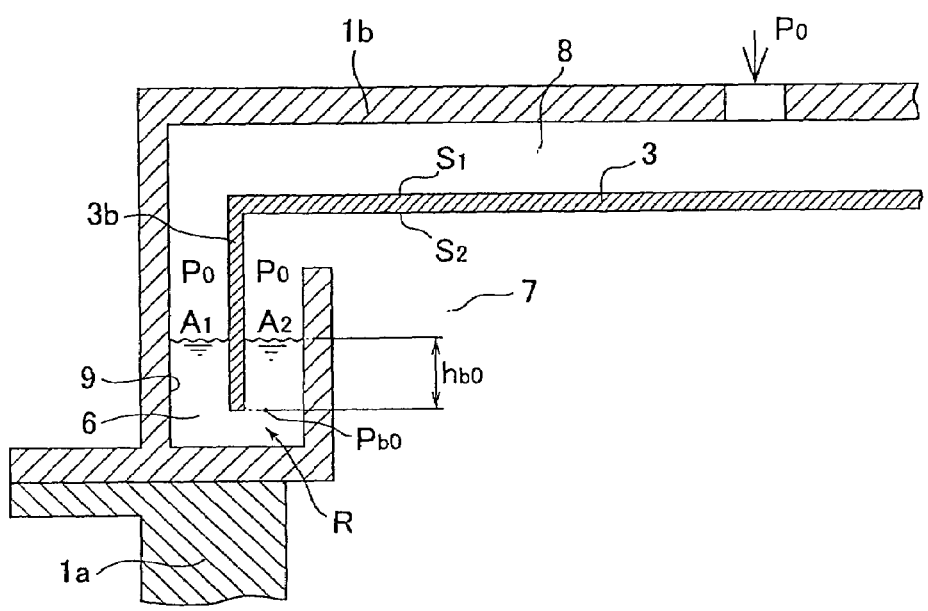
FIG. 3 is a cross-sectional view to illustrate the state of the ring-shaped liquid sealing part R at the time when differential pressure is zero.
Figure 4:
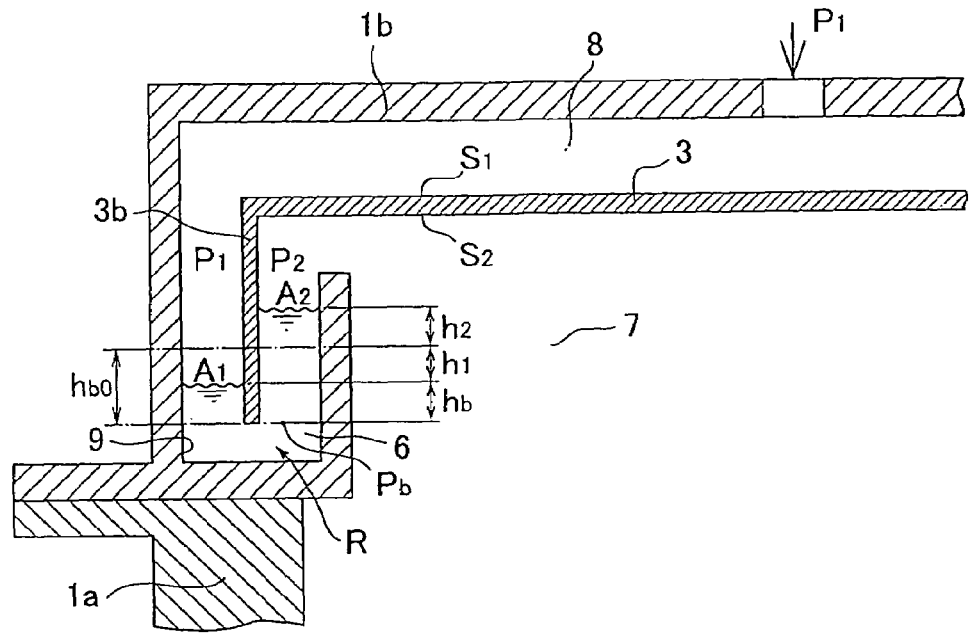
FIG. 4 is a cross-sectional view to illustrate the state of the ring-shaped liquid sealing part at the time when there exists differential pressure.

With the embodiment in FIG. 1, the storage groove 9 is formed at the upper part of the inner peripheral wall face of the lower part body 1a. However, the storage groove 9 can be formed at the inner peripheral wall face of the upper part body 1b instead as illustrated in FIG. 3 and FIG. 4.

The afore-mentioned electronic weighing and pressure converting device 2 is installed inside the pressure space on one side (the inner space 7 of the lower part body 1a), and supported by and fixed to the lower part body 1a.

The afore-mentioned electronic weighing and pressure converting device 2 comprises an electronic weighing device and a computer by which the weight value from the electronic weighing device is converted into a differential pressure and outputted.

A detailed description of the electronic weighing device is omitted here because it is publicly known. To measure a micro-differential pressure ΔP to be measured in the range of the water column of a few hundred nanometer order having effective figures of three digits, the electronic weighing device having the minimum display of approximately 0.0001 g is used as described hereunder. Regarding the maximum measurement capacity, one suitable for the maximum differential pressure to be measured can be chosen.

With the present embodiment, one of the AND-made HX series with an electronic even balance HX-100 having the minimum display of 0.000 g and the maximum measurement capacity of 101 g is employed for the electronic weighing device.

The afore-mentioned pressure receiving plate 3 is made of a plastic material and formed in an inverted dish-shape by processing the plastic material. A sealing wall 3b extends in the downward direction at a right angle downward from the outer periphery of a flat-plate-shaped circular disc 3a. The pressure receiving plate 3 can be made of not only plastic materials but also metal materials.

The said pressure receiving plate 3 is horizontally supported by and fixed to the base 5 of the electronic weighing and pressure converting device 2 via the supporting body 4 with the sealing wall 3b at the outer periphery being inserted into the sealing liquid 6 in the storage groove 9 as illustrated in FIG. 1 such that the pressure receiving plate 3 is never allowed to move up and down.

With the present embodiment, the pressure receiving plate 3 is formed of 2 mm-thick plastic, and its diameter D is chosen to fit the maximum and minimum values of the differential pressure ΔP to be measured as will be explained hereunder.

Furthermore, the afore-mentioned supporting body 4 is made of metal in the shape of a cylinder or a circular truncated cone, and its height is appropriately decided depending on the external dimensions of the device body 1. The supporting body 4 can be made of any material. With the present embodiment, the supporting body 4 is made of brass. The shape of the supporting body 4 is not limited to a cylinder or a circular truncated cone. For example, it can be a rectangular parallelepiped and the like such as a trapezoid a rectangle, a square and the like in the side view.

The storage height of the afore-mentioned sealing liquid 6 can be appropriately decided depending on the level of the differential pressure ΔP to be measured as stated hereinafter.

The weight measurement operation can be so effected that the density of the sealing liquid 6 is not directly related to the downward thrust Fa applied on the electronic weighing and pressure converting device 2 by the differential pressure ΔP to be measured. Hence, any kind of liquid (such as water, oil and the like, for example) can be used for the sealing liquid 6. With the present embodiment, silicon oil is utilized for the sealing liquid 6.

As apparent in FIG. 1, the inside of the device body 1 is hermetically divided into a lower space 7 in communication with a pressure introducing hole 7a and an upper space 8 in communication with a pressure introducing hole 8a by the afore-mentioned pressure receiving plate 3 and the sealing liquid 6. The electronic weighing and pressure converting device 2 is installed inside the lower space 7. The force F corresponding to the pressure difference ΔP=P1−P2>0 (or ΔP=P2−P1>0) between the spaces 7 and 8 applied on the pressure receiving plate 3 is continuously measured by the said electronic weighing and pressure converting device 2, and the weight values as measured are converted to the differential pressures by the computer and outputted as electric signals continuously.

Figure 2:
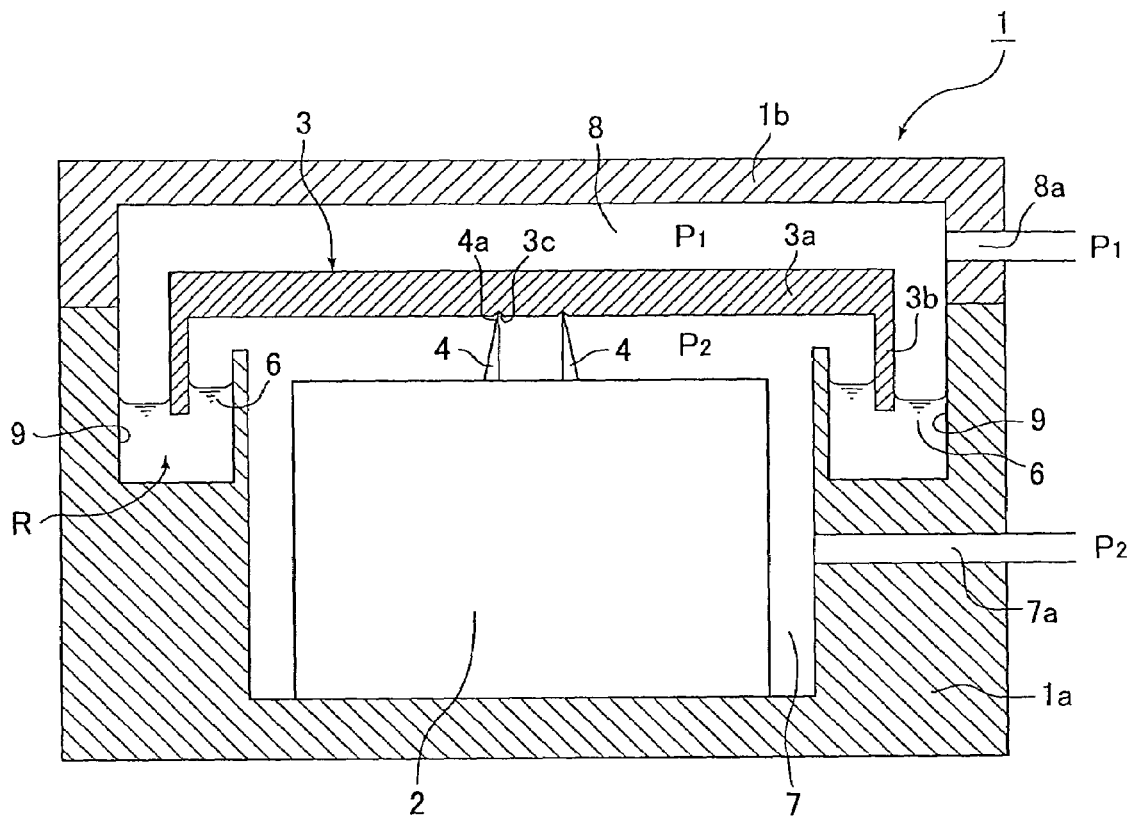
FIG. 2 is a cross-sectional schematic view of the ultra-precision micro-differential measuring device in accordance with another embodiment of the present invention.

FIG. 2 is a cross-sectional schematic view of the ultra-precision micro-differential pressure measuring device in accordance with the second embodiment of the present invention. The device in accordance with second embodiment is the same as the first embodiment illustrated in the afore-mentioned FIG. 1 except for the following, i.e. (1) the upper part body 1b and the lower part body 1a are hermetically coupled without using flanges, (2) ends of the supporting body 4 are pointed, and (3) the electronic weighing and pressure converting device 2 is not equipped with the base. Except for these differences, all the other constructions of the device are identical to those of the device in accordance with the first embodiment.

Namely, the upper end of the afore-mentioned supporting body 4 is in the pointed end shape 4a, and the pointed end 4a is engaged in the receiving groove 3c formed on the lower face side of the pressure receiving plate 3 so that the lateral movement of the pressure receiving plate 3 is prevented. The shape and number of the supporting body 4 can be chosen as desired as long as the pressure receiving plate 3 is securely supported.

With the embodiment in FIG. 2, only the upper end part of the supporting body 4 is formed in the pointed end shape. However, it is possible that both the upper and lower end parts are in the pointed end shape.

Furthermore, with the embodiment in FIG. 2, the electronic weighing and pressure converting device 2 is installed inside the lower space 7. However, the electronic weighing and pressure converting device 2 is installed in the upper space 8 and faces in the downward direction while the pressure receiving plate 3 is suspended and fixed by way of the supporting body 4. When the construction is adopted in which the pressure receiving plate 3 is suspended for support, the weight of the pressure receiving plate 3 is included and considered when determining the offset amount of the electronic weighing and pressure converting device 2.

Next, the principle of the operation of the ultra-precision micro-differential pressure measuring device in accordance with the present invention is described.

FIG. 3 and FIG. 4 are explanatory drawings relating to the differential pressure ΔP applied on the electronic weighing and pressure converting device 2 in the ultra-precision micro-differential pressure measuring device in accordance with the present invention illustrated in FIG. 1. FIG. 3 shows the state of the ring-shaped liquid sealing part R (the sealing wall 3b of the pressure receiving plate 3 and the sealing liquid 6 inside the storage groove 9) shown when the differential pressure ΔP between the lower space 7 and the upper space 8 is zero. FIG. 4 shows the state of the ring-shaped liquid sealing part R shown when there exists the differential pressure P1−P2>0 between the lower space 7 and the upper space 8.

Referring now to FIG. 3 and FIG. 4, S1 designates an area of the upper face of the pressure receiving plate 3, S2 an area of the lower face of the pressure receiving plate 3, ρ a density of the sealing liquid 6, g gravitational acceleration, A1 an area of the outer ring-shaped part of the ring-shaped liquid sealing part R, A2 an area of the inner ring-shaped part of the ring-shaped liquid sealing part R, P0 pressures inside the upper and lower spaces 7 and 8 shown when the differential pressure is zero, hbo a distance between the lower end face of the sealing wall 3b and the liquid level of the sealing liquid 6. Then, the sealing liquid pressure at the lower end face of the sealing wall 3b in the sealing liquid 6 is expressed by the equation, Pbo=Po+ρ g hbo.

As shown in FIG. 4, in the event that the pressure of the upper space 8 and pressure of the lower space 7 are P1 and P2 respectively with the differential pressure P1−P2 (P1>P2) being caused, the liquid level of the outer ring-shaped part descends, while the liquid level of the inner ring-shaped part ascends. Referring to FIG. 4, hb is a distance between the lower end face of the sealing wall 3b and the liquid level of the outer ring-shaped part shown when there exists the differential pressure, h1 is a distance between the liquid level of the outer ring-shaped part shown when there exists the differential pressure and the liquid level shown when the differential pressure is zero, h2 is a distance between the liquid level of the inner ring-shaped part shown when there exists the differential pressure and the liquid level shown when the differential pressure is zero, and Pb is the liquid pressure at the lower end face of the sealing wall 3b shown when there exists the differential pressure.

The liquid pressure Pb at the lower end face of the sealing wall 3b shown when there exists the differential pressure is expressed by the following equation (1):

$$Pb = P1 + \rho g hb = P2 + \rho g(h1 + h2 + hb) \tag{1}$$

$$\text{Also, } P1 - P2 = \rho g(h1 + h2) \tag{2}$$

$$A1 h1 = A2 h2 \tag{3}$$

So, from Equation (2) and Equation (3), the differential pressure P1−P2 is expressed by Equation (4).

$$P1 - P2 = \rho g(1 + A2/A1)h2 \tag{4}$$

$$\text{Also, } hbo = hb + h1 \tag{5}$$

So, a difference F between forces exerted by the pressures applied to the upper and lower faces of the pressure receiving plate 3 is expressed by the following equations (6)~(9).

$$F = S1P1 - \{S2P2 + (S1-S2)Pb\} \quad (6)$$

Here, $(S1-S2)$ is represented by $\Delta S=(S1-S2)$ (7)

Pb in Equation (1) is substituted in Equation (6) to obtain Equation (8)

$$\begin{aligned}
F &= S_1P_1 - (S_2P_2 + \Delta SPb) \quad (8)\\
&= S_1P_1 - [S_2P_2 + \Delta S\{P_2 + \rho g(h_1 + h_2 + hb)\}]\\
&= S_1P_1 - \{(S_2 + \Delta S)P_2 + \Delta S\rho g(h_1 + h_2 + hb)\}\\
&= S_1P_1 - S_1P_2 - \Delta S\rho g(h_1 + h_2 + hb)\\
&= S_1(P_1 - P_2) - \Delta S\rho g(h_1 + h_2 + hb)
\end{aligned}$$

The second term of the above Equation (8) can be rewritten using Equation (5) to obtain Equation (9).

$$\begin{aligned}
F &= S_1(P_1 - P_2) - \Delta S\rho g(h_2 + hb + h_1) \quad (9)\\
&= S_1(P_1 - P_2) - \Delta S\rho g(h_2 + hbo)\\
&= S_1(P_1 - P_2) - \Delta S\rho gh_2 - \Delta S\rho ghbo
\end{aligned}$$

The third term of the above Equation (9) is not counted, that is to say, the term is zero, at the time of measuring the differential pressure by resetting the weight of the pressure receiving plate 3 and the electronic weighing and pressure converting device 2 where the differential pressure is zero. Accordingly, the force Fa actually detected by the electronic weighing and pressure converting device 2 is expressed by Equation (10).

$$Fa = S1(P1-P2) - \Delta S\rho gh2 \quad (10)$$

When h2 is eliminated by substituting Equation (4) in Equation (10), Equation (11) is obtained. Equation (12) for calculating the differential pressure P1–P2, which is ultimately needed, is obtained from Equation (11). Se in Equation (12) is an effective pressure receiving area defined in Equation (13).

$$\begin{aligned}
Fa &= S_1(P_1 - P_2) - \Delta S(P_1 - P_2)/(1 + A_2/A_1) \quad (11)\\
&= S_1(P_1 - P_2)\{1 - (\Delta S/S_1)/(1 + A_2/A_1)\}
\end{aligned}$$

$$(P_1 - P_2) = Fa/Se \quad (12)$$

$$Se = S_1/\{1 - (\Delta S/S_1)/(1 + (A_2/A_1))\} \quad (13)$$

To determine the differential pressure (P1–P2), which is the object of the measurement, from the force Fa measured by the electronic weighing and pressure converting device 2, Fa is divided by the effective receiving area Se.

There is no need at all to make $\Delta S$ particularly small comparing with S1, or to make A2 equal to A1 when the said ultra-precision micro-differential pressure measuring device is designed.

When the differential pressure (P1–P2) is slightly changed, there is seen a slight deformation in the meniscus formed between the liquid level of the sealing liquid 6 and the wall face of the sealing wall 3b. However, because the way the said deformation occurs is opposite between the upper space 8 side (P1 side) and the lower space 7 side (P2 side) with the result that the surface tension resulting from the deformation of the meniscus is compensated, thus not resulting in the lowering of the measuring accuracy of the differential pressure.

If wettability is uneven due to stains and the like on the wall face, there may be a possibility that the wetting state changes over time such that the shape of the meniscus between the liquid surface of the sealing liquid 6, the sealing wall 3b and the sealing liquid storage groove 9 becomes an external factor disturbing the force Fa exerted by the differential pressure (P1–P2).

In such a case, an effective countermeasure is to apply an appropriate treatment onto the liquid-contacting wall face in advance.

As stated above, with the ultra-precision micro-differential pressure measuring device, the differential pressure (P1–P2) can be obtained using Equation (12) by converting the output of the electronic weighing device into the differential pressure by the computer. Any kind of material, shape and the like can be chosen for the sealing liquid 6 and pressure sensing plate 3 for the reason that the above mentioned Equation (12) is irrelevant to the density $\rho$ of the sealing liquid 6 and the weight of the pressure receiving plate 3.

Next, described hereunder is the relation between the external dimensions of the pressure receiving plate 3, the minimum differential pressure measurable with the ultra-precision micro-differential pressure measuring device in accordance with the present invention, and the air flow velocity indicated when the said minimum differential pressure is expressed in terms of the dynamic pressure of the air flow.

Now, if the effective pressure receiving area is designated Se, the differential pressure $\Delta P$, and the force applied to the electronic weighing device F, the afore-mentioned force F can be expressed by Equation F=Se$\Delta P$.

Here, assuming that the weight F as applied by the force caused by the differential pressure $\Delta P$ is 0.1 g, the value of the differential pressure $\Delta P$ to be measured is: $\Delta P$=F/Se=0.1/Se (g/mm$^2$)=0.01/Se (kg/ c m$^2$)=0.01×10$^4$/Se (mmAq) =100/Se (mmAq)

If the velocity of the air flow at the room temperature and normal atmospheric pressure having the dynamic pressure corresponding to the above mentioned differential pressure $\Delta P$ is designated u (m/s), The following equation is obtained:

$$\Delta P = \rho u^2/2g = (1.25/1000)u^2/2 \; g = 0.06378 \cdot u^2 \quad (mmAq)$$

When the differential pressure $\Delta P$ is calculated with Se in the afore-mentioned Equation $\Delta P \approx 100$/Se (mmAq) being a parameter, and the velocity u of the air flow having the dynamic pressure corresponding to the differential pressure is obtained, the results are shown in Table 1 below.

TABLE 1

| | | | |
|---|---|---|---|
| An effective diameter of the pressure receiving surface equivalent to the effective pressure receiving area Se: De mm | 100 | 200 | 400 |
| Measured differential pressure: $\Delta P$ mmAq | 0.01273 | 0.003183 | 0.0007958 |
| The velocity of the air flow at room temperature & normal pressure: u m/s (The velocity of the air flow having the dynamic pressure corresponding to $\Delta P$) | 0.4468 | 0.2234 | 0.02793 |

In Table 1 above, the effective pressure receiving area Se is converted to the effective diameter De mm of the pressure receiving plate.

As stated above, in the event that, for example, the effective diameter De of the circular pressure receiving plate is 100 mm, using the electronic weighing and pressure converting device 2 having the weight measurement capacity F of 0.1 g, the measured differential pressure ΔP is 0.01273 mmAq. The measured differential pressure ΔP is 795.8 nmAq in the event that the effective diameter De is 400 mm. In this case, the differential pressure ΔP of the water column of a few hundred nanometer having effective figures of about three digits can be measured.

As described above, with the ultra-precision micro-differential pressure measuring device in accordance with the present invention, the micro-differential pressure having effective figures of three or more digits can be measured with a high accuracy by employing the electronic weighing and pressure converting device 2 whose weight measurement capacity F is 0.1 g~0.0001 g.

Figure 5:
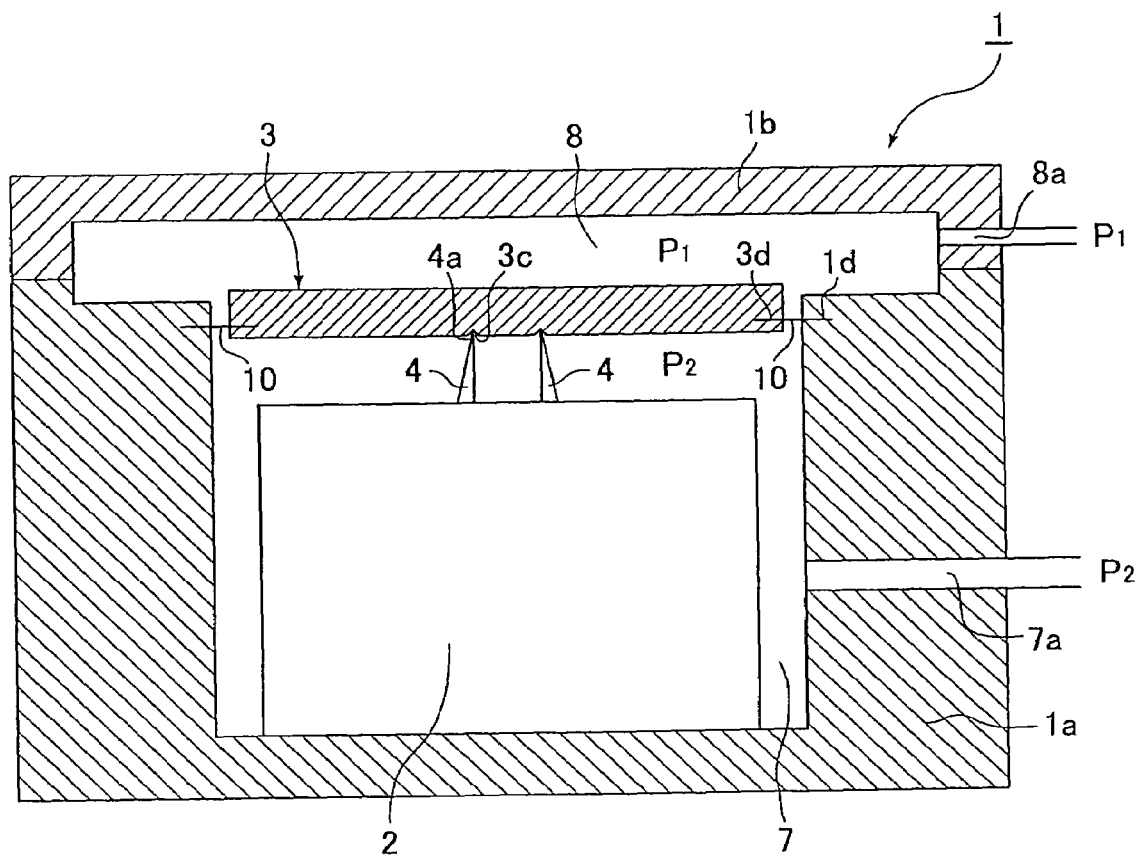
FIG. 5 is a cross-sectional schematic view of an ultra-precision differential pressure measurement in accordance with the second embodiment of the present invention.

FIG. 5 is a cross-sectional schematic view of an ultra-precision differential pressure measuring device in accordance with the embodiment of the second invention. The second invention differs from the first invention in that a dividing film 10 is used instead of the liquid sealing used in the ultra-precision micro-differential pressure measuring device in accordance with the first invention illustrated in FIG. 1 to FIG. 4 inclusive.

Namely, with FIG. 5, 1 designates the device body, 2 the electronic weighing and pressure converting device, 3 the pressure sensing plate, 4 the supporting body (a conical body for the load transmission), 7 the lower space, 8 the upper space, and 10 a dividing film. All the other constructions except for the dividing film 10 are identical to those of the afore-mentioned first invention illustrated in FIG. 1 to FIG. 4 inclusive.

With the second invention in the said FIG. 5, the dividing film 10 is utilized to isolate the upper space pressure P1 (a primary pressure) from the lower space pressure P2 (a secondary pressure) so that the measurable upper limit value of the differential pressure is raised to 2~5 atmospheric pressure.

It is desirable that the dividing film 10 has the following characteristics:
(a) a thin film having flexibility (characteristics of being flexible),
(b) a force to work on the electronic weighing and pressure converting device 2 is not exerted when the dividing film 10 expands or contracts with the temperature change and the like, and
(c) air-tightness is maintained over a long period of time, and excellent corrosion resistance is exhibited. With the present embodiment, a resin film or a thin metal film with thickness of 5~200 μm is used.

To prevent the force to be applied to the electronic weighing and pressure converting device 2 due to an expansion or contraction of the afore-mentioned dividing film 10 owing to the temperature change and the like, both ends of the dividing film 10 are secured to the pressure receiving plate 3 and the lower part body 1a at the same lateral level, that is, height. Furthermore, to reduce a chance that a force to be applied to the afore-mentioned electronic weighing and pressure converting device 2 is induced, the dividing film 10 is somewhat slackened as shown in FIG. 6.

Figure 6:
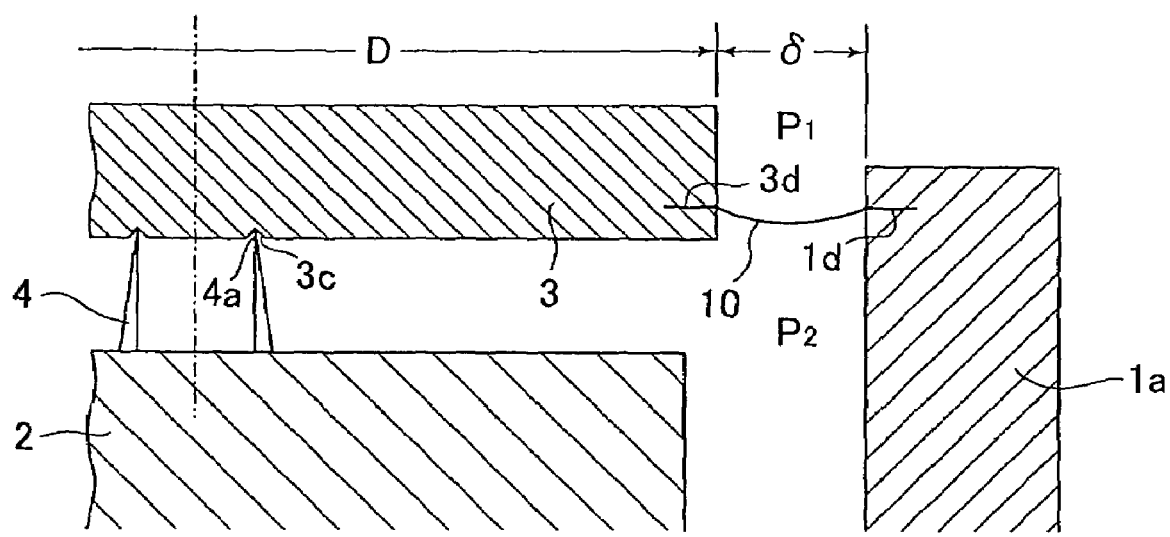
FIG. 6 is a partially enlarged cross-sectional view to illustrate the state of the upper and lower space parts isolated by the dividing film.

FIG. 6 is a partially enlarged cross-sectional view to show how the upper and lower space 8 and 7 are divided by the dividing film 10. The outer and inner peripheral parts of the narrow-width brim- (or ring-) shaped dividing film 10 are inserted into the fitting grooves 3d and 1d formed at a right angle relative to the end face of the pressure receiving plate 3 and the inner surrounding wall face of the lower part body 1a respectively, and hermetically bonded to (or pressed in) them.

Referring to FIG. 6, D designates the diameter of the pressure receiving plate 3, δ a space between the end face of the pressure receiving plate 3 and the inner wall face of the lower part body 1a, Fa a force applied to the electronic weighing and pressure converting device 2 through the supporting body 4 out of a force exerted by the differential pressure (P1−P2, P1>P2), FD a force applied to the pressure receiving plate 3, and Fp a force exerted on the dividing film 10.

The afore-mentioned Fp is equally transmitted to the pressure receiving plate 3 and the lower part body 1a because the space δ is relatively small compared to the diameter D of the pressure receiving plate 3.

Then, the force Fa to be transmitted to the electronic weighing and pressure converting device 2 through the afore-mentioned supporting body 4 is shown as Fa=FD+Fp/2. Here, FD=(P1−P2) × π D²/4, and, Fp=(P1−P2) × π (D +δ) × δ. Then, Fa can be expressed by the following equation (14).

$$Fa = (P_1 - P_2) \times \pi D^2 / 4 + (P_1 - P_2) \times \pi (D + \delta) \times \delta / 2 \quad (14)$$
$$= (P_1 - P_2) \times \pi D^2 / 4 \times \{1 + 2\delta/D + 2 \times (\delta/D)^2\}$$

Now, with the diameter D of the pressure receiving plate 3 and the breadth of the dividing film 10 (or the space δ) being given, (P1−P2)=Fa/[(πD ²/4)×{1+2 δ/D+2 (δ/D) ² }]Fa/K (15) is obtained from the afore-mentioned Equation (14). Here, K=(πD²/4)×[1+2δ/D+2 (δ/D ²)] . . . (16) The differential pressure (P1−P2) can be obtained by dividing Fa detected by the electronic weighing and pressure converting device 2 by the constant K of the denominator.

Feasibility of Industrial Use

The ultra-precision micro-differential pressure measuring device in accordance with the present invention is used as a standard instrument for a differential pressure gauge, and also used for measuring the pressure drop characteristics of a low-resistance filter, monitoring the filter characteristics, assessing the flow characteristics of the fluid equipment which deals with gases under a reduced pressure. The ultra-precision differential pressure measuring device in accordance with the present invention is widely used for the measurement of the differential pressure of approximately 2~5 atmospheric pressure in the industries and the like.

What we claim is:

1. An ultra-precision micro-differential pressure measuring device comprising:
   a device body having an inner space inside;
   a pressure receiving plate installed in the inner space inside the device body and that divides the inner space hermetically into a lower space and an upper space;
   an electronic weighing and pressure converting device installed inside the lower space and on which the pressure receiving plate is supported and fixed; and
   a liquid sealing part that liquid-seals the outer peripheral part of the pressure receiving plate and air-tightly separates the lower space and the upper space so that a micro-differential pressure between a pressure P1 inside the upper space and a pressure P2 inside the lower space is measured by the electronic weighing and pressure converting device via the pressure receiving plate.

2. An ultra-precision micro-differential pressure measuring device as claimed in claim 1, wherein the device body is constructed so that a lower part body provided with a pressure introducing hole in communication with the lower space and an upper part body provided with a pressure introducing hole in communication with the upper space are placed opposite to each other and combined with each other to form the device body, and the device body is provided with a ring-shaped sealing liquid storage groove at the inner wall face of the inner space.

3. An ultra-precision micro-differential pressure measuring device as claimed in claim 1, wherein the pressure receiving plate comprises a flat-shaped disc plate and a sealing wall that extends downwardly from the outer periphery of the disc plate.

4. An ultra-precision micro-differential pressure measuring device as claimed in claim 1, wherein the electronic weighing and pressure converting device is constructed so that measurement values are continuously taken out of the electronic weighing and pressure converting device in the form of electric signals, converted into differential pressures by a computer and outputted.

5. An ultra-precision micro-differential pressure measuring device as claimed in claim 4, wherein the electronic weighing and pressure converting device comprises an electronic weighing device and a computer that converts measurement signals from the electronic weighing device to differential pressures.

6. An ultra-precision micro-differential pressure measuring device as claimed in claim 1, wherein the electronic weighing and pressure converting device has a supporting base on which a supporting body is provided so that the pressure receiving plate is supported by and fixed to the supporting body.

7. An ultra-precision micro-differential pressure measuring device as claimed in claim 1, wherein the electronic weighing and pressure converting device is constructed so that the pressure receiving plate is supported by and fixed to the supporting body whose upper ends or lower ends or both are pointed.

8. An ultra-precision micro-differential pressure measuring device as claimed in claim 1, wherein the liquid sealing part comprises a ring-shaped sealing liquid storage groove formed at the inner wall face of the inner space of the device body, a sealing liquid filled in the sealing liquid storage groove, and the ring-shaped sealing wall extends downwardly from the periphery of the pressure receiving plate, a lower end of which is inserted into the sealing liquid from above.

9. An ultra-precision micro-differential pressure measuring device as claimed in claim 8, wherein the liquid sealing part is surface-treated so that uniform wettability is secured entirely or partly on a liquid contacting part.

* * * * *